United States Patent [19]

Wren

[11] 3,926,440

[45] Dec. 16, 1975

[54] RECORD PLAYERS

[75] Inventor: John Pelham Wren, Swindon, England

[73] Assignee: Plessey Handel und Investments A.G., Zug, Switzerland

[22] Filed: Aug. 19, 1974

[21] Appl. No.: 498,812

[30] Foreign Application Priority Data

Aug. 21, 1973 United Kingdom .............. 39452/73

[52] U.S. Cl. .................... 274/14; 274/1 J; 274/23 R

[51] Int. Cl.$^2$ .......................................... G11B 17/06

[58] Field of Search ......... 274/1 J, 1 R, 13 R, 15 R, 274/14, 20, 21, 22, 23 R, 23 A, 23 B, 45, 46 B

[56] References Cited

UNITED STATES PATENTS 1,872,366 8/1932 Van Dyck ........................... 274/1 J

*Primary Examiner*—Richard E. Aegerter
*Assistant Examiner*—Larry Jones
*Attorney, Agent, or Firm*—Blum Moscovitz Friedman & Kaplan

[57] ABSTRACT

A record player comprising a record turntable for receiving a record, a motor for driving said record turntable, a pickup for engaging said record, and a pickup arm which supports said pickup, said pickup arm being movable in a first mode backwards and forwards across said record turntable and in a second mode up and down so that said pickup can be moved into and out of engagement with a said record on said record turntable, said movement of said pickup arm in at least one of said first and second modes being effected by electro-mechanical means including an elongate conductive element and means for enabling an electric current to be applied to said conductive element, said conductive element being such that it becomes hot and elongates under the affect of said electric current and cools and contracts when said electric current is discontinued, and said pickup arm being caused to move one way consequent upon said elongation of said conductive element and said pickup arm being caused to move the other way consequent upon said contraction of said conductive element.

3 Claims, 4 Drawing Figures

RECORD PLAYERS

This invention relates to record players.

Record players include a motor and turntable for rotating records to be played at a desired and uniform speed, a tone or or pickup arm that moves over the record surface, and a pickup consisting of a cartridge and stylus to pick-off the sound vibrations from the record grooves and translate them into a corresponding audio signal. The known record players include complicated mechanisms for effecting automatic movement of the pickup arm. Thus, for example, the mechanisms are often required to move the pickup arm vertically upwardly from a rest point, then laterally across the record, and then vertically downwardly until the stylus contact the record. After the record has finished playing, the pickup may be required to move vertically upwardly and then laterally across and away from the record to a pause position to allow a further record to fall. Alternatively, after a record has finished playing, the pickup arm may be required to move vertically upwardly, then laterally away from the record and finally vertically downwardly onto its rest point. It will thus be appreciated that there are various movements which the pickup arm must execute and, as stated above, in known record players, various complicated mechanisms driven from the motor of the record player have been employed to move the pickup arm.

It is an aim of the present invention to provide a record player having a much simplified arrangement for effecting movement of the pickup arm.

Accordingly, this invention provides a record player comprising a record turntable for receiving a record, a motor for driving said record turntable, a pickup for engaging said record, and a pickup arm which supports said pickup, said pickup arm being movable in a first mode backwards and forwards across said record turntable and in a second mode up and down so that said pickup can be moved into and out of engagement with a said record on said record turntable, said movement of said pickup arm in at least one of said first and second modes being effected by electro-mechanical means including an elongate conductive element and means for enabling an electric current to be applied to said conductive element, said conductive element being such that it becomes hot and elongates under the affect of said electric current and cools and contracts when said electric current is discontinued, and said pickup arm being caused by connection means to move one way consequent upon said elongation of said conductive element, "connection means for operationally connecting said conductive element with said pickup arm" after "conductive element" and said pickup arm being caused by connection means to move the other way consequent upon said contraction of said conductive element.

A wire may be arranged to pass around a circular member, e.g. a drum or a rod, extension of the wire being taken up by a resilient member, e.g. a spring, which causes the circular member to rotate. The circular member is appropriately connected to cause the required lateral movement of the pickup arm. Preferably, the resilient member is a spring which is connected axially in line with the wire. However, if desired, the spring could be connected to a thread which would be arranged to pull the wire, other than in the axial direction, e.g. perpendicularly, when the wire is elongated by the electric current.

When it is desired to move the pickup arm in a vertical position, the wire may be arranged to restrain a biassed member, extension of the wire allowing the member to move under the action of the biassing means to a desired condition, e.g. a condition in which the member causes the stylus to be raised from the record. Alternatively, the wire may be arranged to contact the back of a pickup arm so that if the pickup arm is normally biassed in an up position and elongation of the wire will allow the arm to drop.

Although the time constant might be relatively long in most applications, an alternative arrangement could use an external heating element to cause the expansion of a second component, for example a bi-metal strip. This arrangement could be more suited to the release of a mechanical trip, such as an auto stop, where the actuator could replace the conventional trip pawl in an automatic turntable, to initiate the cam cycle for automatic pickup arm movements on record changing.

Wires of various cross section may be utilized, e.g. of circular or square cross section. It is presently preferred that the wire be of a ribbon section. To achieve a reasonably short response time, either a thin wire or a flat strip can for example be used. The latter is preferred as the additional stiffness is beneficial for stability where there is significant inertia in the mechanical system.

Direct or alternating current may be employed to heat the wire and various circuits may be employed. A simple circuit could include a simple potentiometer controlled current source whilst a more complicated circuit could include an electronic control producing a ramp or other desired waveform. The rate of the waveform may also be controlled to produce fast and slow movements of the pickup arm.

If a constant current is applied to the actuator, the mechanical movement will be exponential with respect to time. To obtain a substantially linear movement, with time, either the mechanics of the actuator can be arranged to use an early segment of the exponential movement - allowing the remainder of the expansion or contraction to be lost motion - or the current applied to the actuator can be arranged to be an inverse of the exponential with time.

Embodiments of the invention will now be described by way of example and with reference to the accompanying drawings in which.

Figure 1:
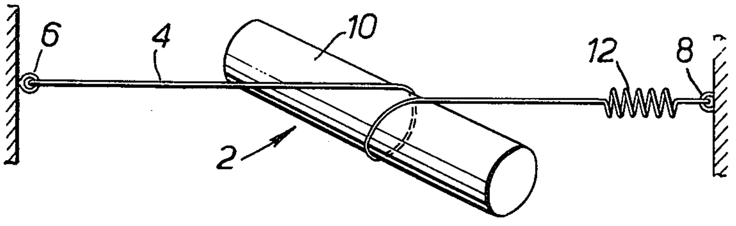
FIG. 1 shows a first simple electrol-mechanical means for use in a record player of the invention.

Referring to FIG. 1, there is shown an electro-mechanical arrangement 2 which includes a wire 4 which becomes elongated when a current is applied to it. The wire is connected to electrical terminals 6, 8 and an electric current is passed through the wire 4 by means of the terminals. As shown in FIG. 1, the wire 4 is wrapped once around a drum 10. A spring 12 is arranged axially in line with the wire 4 and in fact can be manufactured to form part of the wire 4.

In operation of the electro-mechanical arrangement 2, a current is passed through the wire 4 by means of the terminals 6, 8, and the wire thus becomes elongated due to the heat generated in the wire. Since the wire is tensioned by the spring 12, any elongation of the wire 4 is taken up by the spring 12 and this effectively causes the wire 4 to be moved to the right as viewed in FIG. 1. Since the wire 4 is wrapped around the drum 10, this movement to the right will cause clockwise rotation of the drum 10. The drum 10 is so connected to a pickup arm as to cause lateral movement of the pickup arm, e.g. about a pivot point. When it is desired to return the pickup arm to its original position, the current is switched off and the wire 4 will contract to its normal length. In other words it will move towards the left as viewed in FIG. 1 against the force of the spring 12. This will cause anti-clockwise rotation of the drum 10 which will in turn cause the pickup arm to move back to its original position.

Various types of arrangement for connecting the drum to the pickup arm can be employed including various mechanical linkages. The wire will be such that its elongation for any amount of current will be known so that if the precise elongation of the wire is known, the precise amount of travel of the pickup arm can easily be determined.

Figure 2:
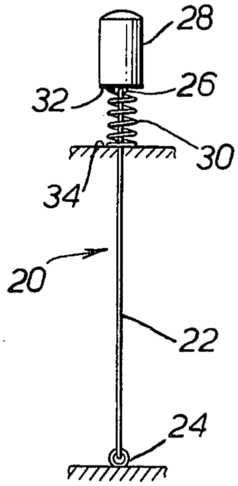
FIG. 2 shows a second simple electro-mechanical means for use in a record player of the invention.

Referring now to FIG. 2, there is shown an electro-mechanical arrangement for moving a pickup arm (not shown) in a vertical direction. More specifically, there is shown an electro-mechanical arrangement 20 comprising a wire 22 which becomes elongated when a current is applied to it. The wire 22 is held between electrical terminals 24, 26, and current is applied to the wire 22 via these terminals. The terminal 26 is also connected to a member 28 which can in turn be connected to the bottom of a pickup arm (not shown). The member 28 is constantly biased in a vertical direction as viewed in FIG. 2 by means of a compression spring 30 which abuts against the face 32 of the member 28 and against an abutment 34.

In operation of the electro-mechanical device 20 shown in FIG. 2 it will be seen that the member 28 is always biassed vertically by means of the spring 30 but that movement of the member 28 is prevented by the wire 22. When an electrical current is passed through the wire 22, the wire 22 will elongate and the spring 30 can therefore move the member 28 vertically and away from the abutment 34. The member 28 may be connected directly to the pickup arm as indicated above or it may be connected indirectly to the pickup arm through a series of linkages. In any event, the electro-mechanical arrangement 20 shown in FIG. 2 can be easily utilised to effect vertical movement of the pickup arm. As in the case of FIG. 1, the precise elongation of the wire 22 for any current will be known so that the precise vertical movement of the pickup arm can be readily determined.

Figure 3:
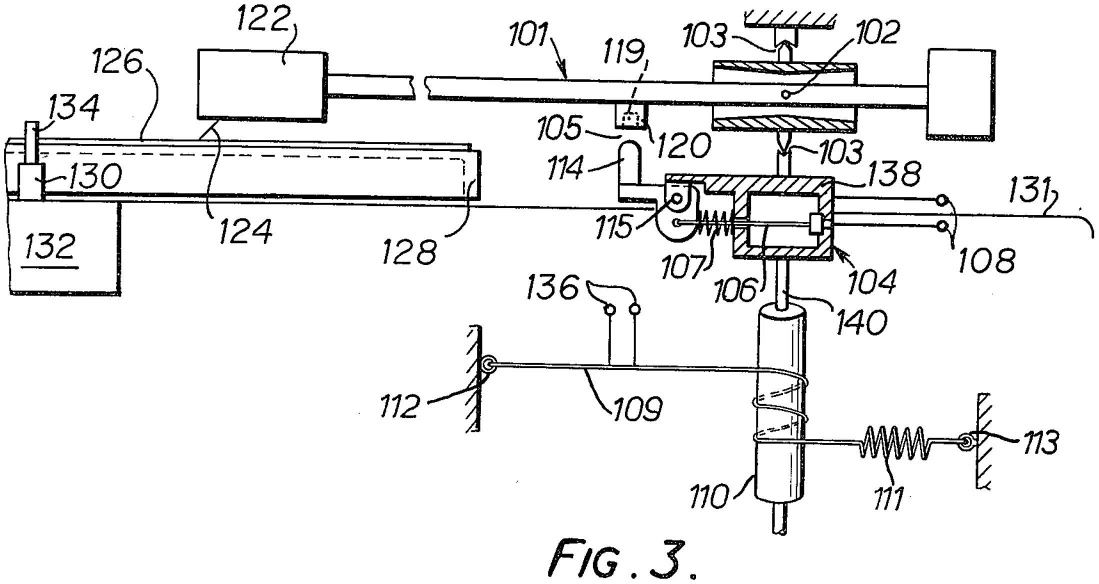
FIG. 3 shows a record player of the invention embodying electro-mechanical means similar to the electro-mechanical means shown in both FIGS. 1 and 2.

Referring now to FIG. 3 a pickup arm 101 pivots on vertical and horizontal bearings 102 and 103. The pickup arm 101 can be lifted at point 105 by a clutch assembly 104, which may be either a conventional mechanical lifting platform arrangement or the arrangement shown with the 'hot strip' 106 and compression spring 107 energised by current at terminals 108. Expansion of 'hotstrip' 106 allows spring 107 to move lifting pin 114 upwards by causing it to pivot clockwise about pivot point 115. Pin 114 moves upwardly until it enters an aperture 119 in an abutment 120, whereupon further upward movement of the pin 114 causes the pickup arm 101 to lift upwardly. Additional linkages (not shown) may be used to magnify motion to the degree of mechanical advantage required.

A pickup 122 having a needle 124 is attached to the pickup arm 101. Thus, as the pickup arm 101 is moved upwardly, the pickup 122 is also moved upwardly and the needle 124 comes out of engagement with a record 126 on a record turntable 128. The record turntable 128 rotates about a central spindle 130 which is driven by a motor 132. A record spindle 134 holds the record 126 on the record turntable 128 and the spindle 134 fits into the spindle 130. The various parts of the record player may be mounted on a main plate 131.

After the pickup arm is lifted, it can be rotated, utilising tension spring 111, by hot strip 109 around drum 110 by means of current passing between terminals 112 and 113. More specifically, when an electric current is applied to the strip 109 from terminal 136, the strip 109 gets hot and expands. The expansion is taken up by spring 111. Since the strip 109 passes around the drum 110, the action of the spring 111 in taking up the expansion of the strip 109 causes the drum 110 to rotate clockwise. The drum 110 is connected to the clutch housing 138 by a rod 140. Rotation of drum 110 thus causes the rod 140 and clutch housing 138 to rotate in the same direction. Rotation of the housing 138 causes the pin 114 to rotate in the same direction (i.e. clockwise). Since the pin 114 is in the aperture 119, the abutment 120 and the pickup arm 101 are also rotated clockwise. When an electric current is no longer applied to the strip 109, the strip will contract and all the aforenoted parts will be moved anti-clockwise. Obviously, if it is desired not to move the pickup arm 101 from its clockwise rest position, then the electric current to strip 106 will be stopped before stopping the electric current to strip 109. In this case, the contraction of the strip 106 will cause the pin 114 to come out of the aperture 119 in the abutment 120 so that any subsequent anti-clockwise rotation of the pin 114 will not be transmitted to the pickup arm 101.

Figure 4:
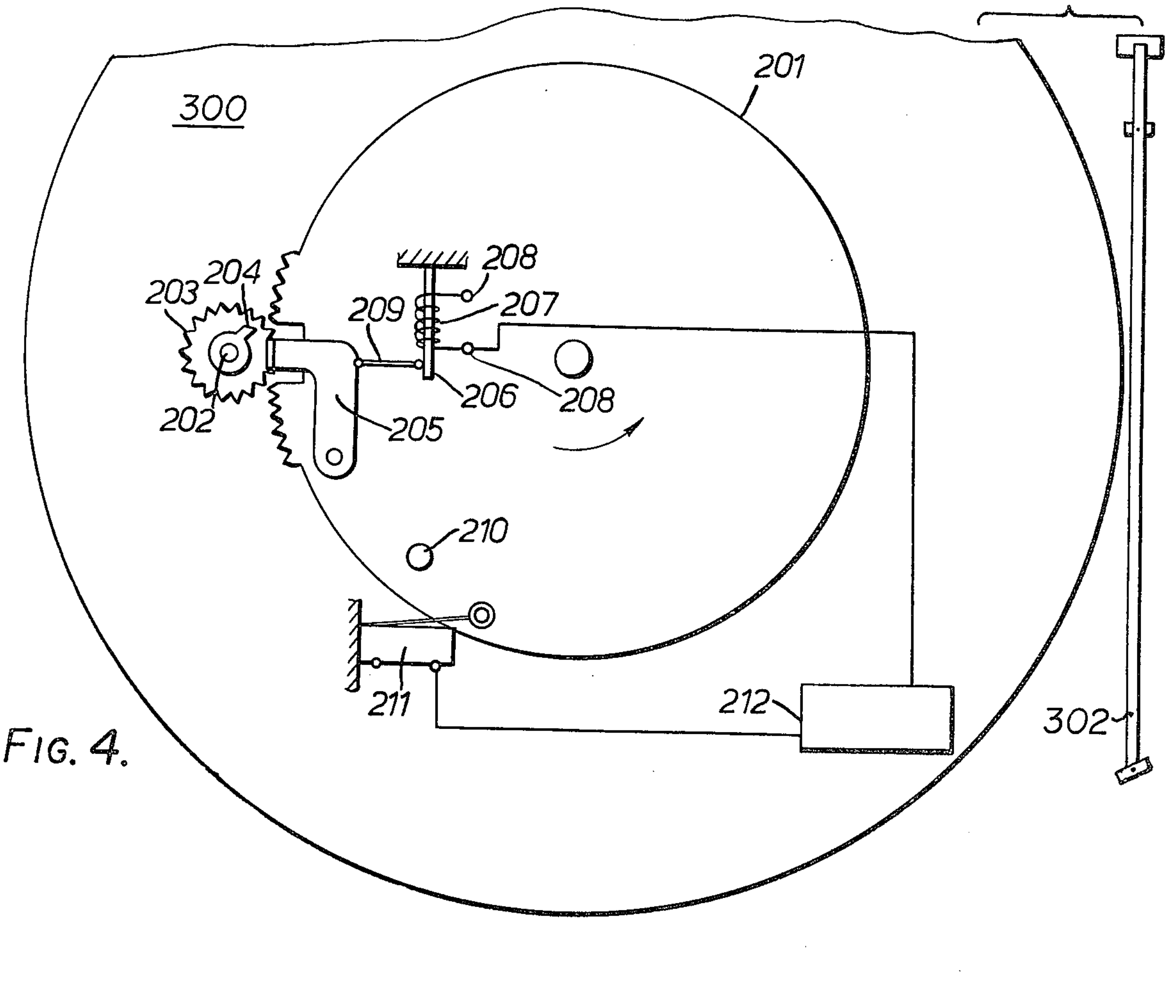
FIG. 4 shows a record player of the invention embodying other electro-mechanical means.

Referring now to FIG. 4, there is shown a conventional cam operated automatic record player having a trip mechanism with a turntable centre 202 and a turntable drive pinion 203 which can drive cam 201, the pinion also carrying lug 204 which is designed to engage trip pawl 205 as a record on a turntable 300 enters its lead-off groove. Instead of the pickup arm 302 being mechanically connected to the trip pawl 205, the pawl is moved into trip with the lug 204 by the elongation and bending of a bimetal bending strip 206 which occurs when an electric current is applied to a heating coil 207 from terminals 208. As shown in FIG. 4, a mechanical link 209 connects the strip 206 with the trip pawl 205. Items 206, 207 and 208 could be replaced with a 'hot strip' as items 106 and 107 in FIG. 3.

The current at terminals 208 is derived from an electrical or electronic auto trip circuit similar to that which may be used in U.S. patent application Ser. No. 452641. Pin 210 on cam 201 operates switch 211 after trip has occurred (trip pawl 205 having been moved into engagement with revolving lug 204 by the end-of-record actuator 206 and so having moved cam 201 that its teeth enmesh with revolving pinion 203). Switch 211 disconnects control circuit 212 and current to terminals 208 so that the trip pawl 205 is reset, away from path of lug 204 before the cam 201 has completed its cycle.

It will be apparent that the embodiments of the invention described above with reference to the drawings have been given by way of example only. Thus, for example, the spring 12 need not be aligned in the wire 4 as shown in FIG. 1 and the spring 12 could be arranged at right angles to the wire 4 and possibly connected to the wire 4 through the intermediary of a thread. Elongation of the wire 4 would then be taken up by movement of the wire 4 in a line perpendicular to its axis. Also, in the case of FIG. 2, the member or pin 28 could be arranged to pull down the back of the pickup arm behind the pivot of the pickup arm so that the arm is normally in an up position. Elongation of the wire would then allow the pickup arm to drop. Parts of the apparatus and associated electrical circuitry described in our co-pending U.S. patent application Ser. No. 452641 may also be employed.

What we claim is:

1. A record player comprising a record turntable for receiving a record, a motor for driving said record turntable, a pickup for engaging said record, and a pickup arm which supports said pickup, said pickup arm being movable in a first mode backwards and forwards across said record turntable and in a second mode up and down so that said pickup can be moved into and out of engagement with a said record on said record turntable, said movement of said pickup arm in at least one of said first and second modes being effected by electro-mechanical means including an elongate conductive element, connection means for operationally connecting said conductive element with said pickup arm and means for enabling an electric current to be applied to said conductive element, said conductive element being such that it becomes hot and elongates under the effect of said electric current and cools and contracts when said electric current is discontinued, and said pickup arm being caused by said connection means to move one way consequent upon said elongation of said conductive element and said pickup arm being caused by said connection means to move the other way consequent upon said contraction of said conductive element.

2. A record player according to claim 1 in which said connection means includes a cylindrical member, and in which said elongate conductive element passes around said cylindrical member, said cylindrical member being caused to rotate one way consequent upon said elongation of said conductive element and said cylindrical member being caused to rotate the other way consequent upon said contraction of said conductive element, and said cylindrical member being operatively connected to said pickup arm.

3. A record player according to claim 1 in which said connection means includes pivot means, and in which said conductive element acts directly on said pivot means for raising and lowering said pickup arm.

* * * * *